Jan. 18, 1938.　　　　J. U. LANGLOIS　　　　2,105,976
BEARING
Filed July 8, 1937

INVENTOR,
JOSEPH U. LANGLOIS,

Geo. F. Kimmel,
ATTORNEY.

Patented Jan. 18, 1938

2,105,976

UNITED STATES PATENT OFFICE 2,105,976

BEARING

Joseph Ulfranc Langlois, Hull, Quebec, Canada

Application July 8, 1937, Serial No. 152,633
In Canada January 19, 1937

5 Claims. (Cl. 308—187)

My invention relates to mechanical bearings and is an improvement on that type of bearing in which a shaft has both rotary and longitudinal motions.

In such installation, such as in wood planers, rotary sanders and grinders, the abrasive supporting shafts are usually given a longitudinal reciprocating motion to avoid excessive loading of the abrasive or cutters on the work. In such machines the main bearings are, therefore, provided with means to allow the necessary play to the shafts which means that, in the case of ball or roller bearings, a longitudinal reciprocating motion of the ball cage is present. This causes a pumping action, exhausting and drawing air successively at both ends of the bearing, causing dust and grit to enter around the shaft, no matter how closely fitted it may be, and ruin the bearings. This results in a heavy loss, due to the idling of the machine, notwithstanding the cost of renewals and the uncertainty of results. A further disadvantage of the pumping action in the bearing is in the impossibility of retaining lubricant therein.

The objects of my invention, therefore, are:

First, to provide means in a bearing to avoid pumping at each end thereof caused by longitudinal motion of its internal parts.

Second, to provide a bearing of the type mentioned, wherein the above-mentioned means are so disposed as not to be a recipient for lubricant and dirt, thereby becoming inoperative.

Figure 1:
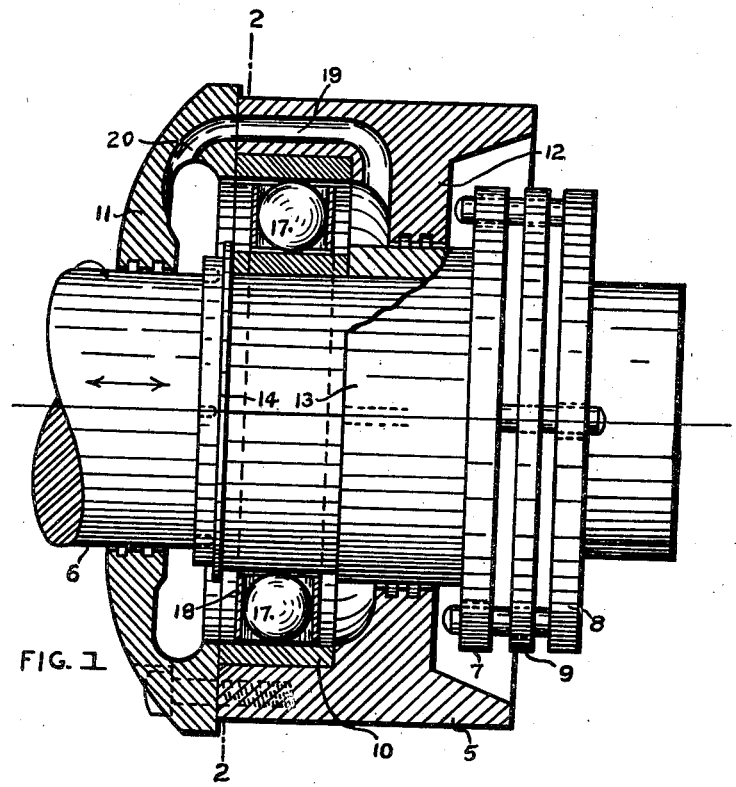
Figure 2:
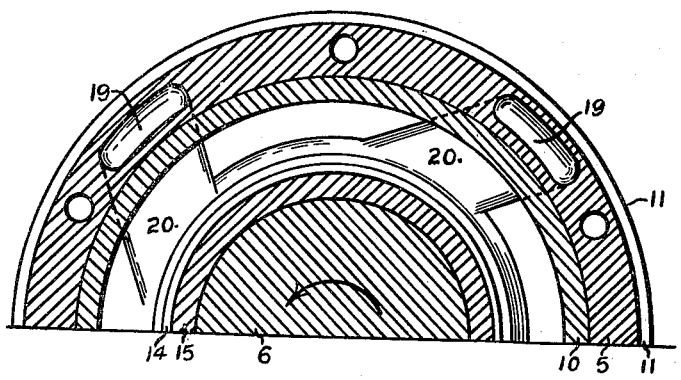

Usual bearings of this type comprise a case having a hardened race and a race on the shaft. Steel balls are interposed between the two races and held in proper relation between themselves and the races by a bronze cage. A bearing of this type is shown in the accompanying drawing, in which, Figure 1 is a longitudinal section of the bearing and shaft;

Figure 2 is a cross-section of the upper half of the bearing and shaft taken on line 2—2 of Fig. 1.

Similar reference numerals denote identical parts in both figures.

In the drawing, 5 is the bearing case, 6 its shaft, 7 coupling flange for the shaft, 8 the flange mate mounted to a motor or other source of power (not shown) and 9 the interposed resilient coupling disc. Pressed in the larger bore of the casing is race 10 held in place between bearing case flange 11 and integral case wall 12. It will be seen that wall 12 and flange 11 fit close around shaft 6 and hub 13 of the coupling respectively, both being provided with oil grooves as shown.

Held between hub 13 and guide washer 14 is a second race 15 mounted around shaft 6. Both races are of hardened steel and are held concentrically by a series of hardened steel balls 17 interposed therebetween and held in proper relation both radially and laterally by a bronze cage 18.

As previously mentioned, for reasons stated, shaft 6 has longitudinal motion with the result that balls 17 and cage 18 also reciprocate. It is evident that these latter act as a piston in the case which serve as cylinders so that pumping action results on both sides of the cage. Notwithstanding the presence of walls 11 and 12 foreign matter will be drawn in the bearing while lubricant will be ejected.

In order to remove the drawbacks, I provide an air passage from one side of the ball bearing to the other so as to relieve pressure and suction as the case may be. One of such passages is shown in Fig. 1 while at 19 two are shown in Fig. 2. Of course, any number of these passages may be provided depending on their size in proportion with the area required to properly satisfy the air current without undue friction.

It is obvious that openings to the atmosphere would not serve the purpose since they would provide exactly what is aimed to remove by allowing foreign matter to be pumped in the bearing.

It will be noted that in this particular instance, the passage or passages are oblong to provide greater area and pass from the space between wall 12 and cage 18 to case flange 11 where it or they register with a continuation 20 thereof leading to the space between the inner part of the flange and the cage.

Referring to Fig. 2, it will be seen that the passages lead longitudinally in flange 11 in the direction of rotation of the shaft as indicated by arrow. The same applies to the ends of the passages in wall 12. The purpose of this angle is to avoid the tendency of lubricant from flying from the shaft into the passages. In this manner it will strike the side of the passage and flow back to the bearing.

It will be noted that, though not necessarily so, the passage or passages, as the case may be, are preferably at the top of the case since a supply of lubricant may rest in the lower part thereof.

While I have described my invention strictly in accordance with the embodiment shown, it is to be understood that many changes may be made as to the structure and location or type of passages without departing from the spirit of my invention and scope of my claims.

What I claim is:

1. In a bearing comprising reciprocating shaft supporting elements therein; pressure relieving bypass leading from one side to the other of said elements.

2. In a bearing comprising a shaft enclosing case and reciprocating bearing elements in said case, pressure relieving bypass leading from one side to the other of said element.

3. In a bearing comprising a shaft surrounding case having a wall at one end, a ball bearing at the other, a wall flange at the said other end of said case, pressure relieving passages in said case leading from one side of said ball bearing in register with passages in said flange leading to the other side of said ball bearing.

4. In a bearing comprising a shaft enclosing case and reciprocating bearing elements in said case, a pressure relieving bypass in the outer shell of said case leading from one side to the other of said elements.

5. In a bearing comprising a shaft enclosing case and reciprocating bearing elements in said case, and walls in said case surrounding a shaft, a bypass starting radially from said shaft on one side of said elements terminating radially of said shaft on the other side of said elements, said starting and terminating ends of said pass disposed tangentially with said shaft in the direction of its intended rotation.

JOSEPH ULFRANC LANGLOIS.